(12) United States Patent
Janko et al.

(10) Patent No.: US 6,437,821 B1
(45) Date of Patent: Aug. 20, 2002

(54) HARMONIC MEASUREMENT OF BLOCKINESS IN VIDEO SIGNALS

(75) Inventors: Bozidar Janko, Portland; John Raitz, Beaverton, both of OR (US)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 09/469,927

(22) Filed: Dec. 22, 1999

(51) Int. Cl.[7] .............................................. H04N 17/00
(52) U.S. Cl. ...................................... 348/180; 348/192
(58) Field of Search ................................ 348/180, 192, 348/200, 607, 618; 382/268; 375/240.24

(56) References Cited

U.S. PATENT DOCUMENTS 6,119,083 A * 9/2000 Hollier et al. ............... 704/203

FOREIGN PATENT DOCUMENTS

| EP | 0886444 A2 | * 12/1998 | ............ H04N/7/30 |
|----|------------|-----------|----------------------|
| GB | 2 347 811  | 12/1998   |                      |

OTHER PUBLICATIONS

US 5,654,754, 08/1997, Augenbraun et al. (withdrawn)*
J. Huang, Y.Q. Shi, X. Dai, "Blocking Artefact Removal Based On Frequency Analysis", Electronics Letters, Nov. 26, 1998, vol. 34, No. 24.
H. Koda, H. Tanada, "A New Method of Measuring the Blocking Effects of Images Based on Cepstral Information", IEICE Trans. Fundamentals, Aug. 1996, vol. E79–A, No. 8, Japan.

* cited by examiner

Primary Examiner—Victor R. Kostak
(74) Attorney, Agent, or Firm—Francis I. Gray

(57) ABSTRACT

A method of measuring blockiness in a video signal generates a power spectrum for a video field of the video signal. The largest peaks of the power spectrum at the higher frequency end of the power spectrum are initially selected and a common frequency interval between peaks is determined. The contribution to the amplitude of peaks at the common frequency interval by peaks at other than the common frequency interval are subtracted from the amplitude of the peaks at the common frequency interval. The average of the corrected amplitudes of the peaks at the common frequency interval is obtained and normalized as a blockiness metric for the video signal.

7 Claims, 2 Drawing Sheets

HARMONIC MEASUREMENT OF BLOCKINESS IN VIDEO SIGNALS

BACKGROUND OF THE INVENTION

The present invention relates to the assessment of picture quality for video image signals, and more particularly to a harmonic method and apparatus for measuring blockiness in video image signals.

In digital video transmission where bandwidth is important, such as transmission over satellite link, the video signal is subjected to varying degrees of compression to decrease the bandwidth required for each video channel. The compression standards typically used, such as JPEG, MPEG or proprietary variants thereof, are "lossy"—to achieve higher compression they allow distortions to occur in an image represented by the video signal. The amount of distortion is a function of the complexity of the image and of the number of bits per second (bit rate) a compression encoder is allowed to use. Ideally the amount of compression is maximized while still providing a video image or picture to the customer that is free of disturbing artifacts.

Current devices to analyze picture quality, such as the PQA200 Picture Quality Analyzer manufactured by Tektronix, Inc. of Beaverton, Oreg., USA, are reference-based. A video signal transmitted through a video system is compared with the original video signal as a reference video signal in a measurement device. The reference video signal is either stored in the measurement device or is transmitted via some other non-distorted pathway to the measurement device. Use of a reference video signal is necessary for extremely accurate algorithms, such as the Sarnoff Corporation JNDmetrix™ human visual model algorithm. However, this means that measurements are only made on video signals whose contents are either known in advance or are immediately available, such as double-checking an encoder at the source.

Other potential methods of measuring discrete cosine transform (DCT) based codec degradations involve directly examining the coarseness of the quantization scale in the compressed video stream, optionally combined with a measure of the complexity of the original image transmitted by some means outside the video channel—a form of compressed reference. This method is not as accurate, and in any case can only make measurements on compressed video, not video that has been already decompressed and potentially passed through other systems, including other additional codecs, prior to end-user delivery.

What is desired is a method and apparatus that allows measurement of blockiness artifacts, such as incurred when compressing video using discrete cosine transforms, in situations where there is no prior knowledge of the blockiness period and in the presence of image-content generated noise.

BRIEF SUMMARY OF THE INVENTION

Accordingly the present invention provides a harmonic method and apparatus for measuring blockiness in a video input signal. A power spectrum is obtained for a video field of the video input signal as the Fast Fourier transform of the sum of the lines in the video line after edge filtering. The largest frequency peaks from the higher frequency end of the power spectrum are initially selected, and a common period for the peaks is determined representing a common frequency interval. The amplitudes of the peaks at the common frequency interval are corrected for the contributions made by peaks at one-half and double the common frequency interval. The corrected amplitudes of the peaks at the common frequency interval are averaged and normalized to produce a blockiness metric for the video input signal.

The objects, advantages and other novel features of the present invention are apparent from the following detailed description when read in conjunction with the appended claims and attached drawing.

DETAILED DESCRIPTION OF THE INVENTION

The basis for the present invention is the observation that spectra of video fields impaired with blockiness artifacts have a characteristic form, as illustrated in FIGS. 1A–D. Such spectra of a video field are obtained by edge filtering each line carrying video luma content, summing all the video lines from one video field into one line, and then taking a Fourier transform, such as a Fast Fourier Transform (FFT), of the resulting line.

Figure 1A:
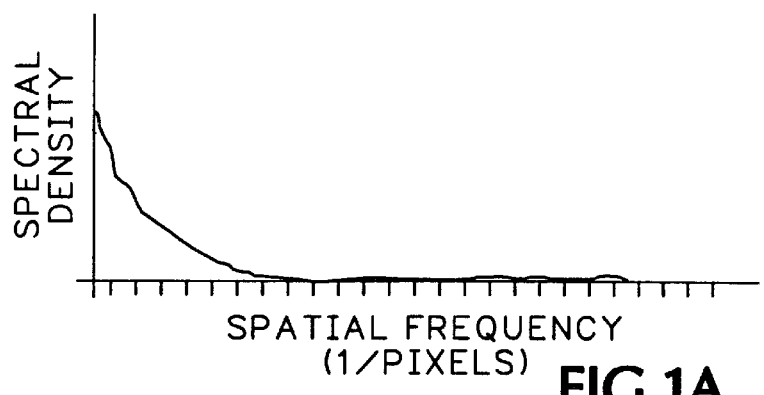
FIGS. 1A–D are graphic views of the spectrum of a video signal without and with blockiness and with spurious peaks.
Figure 1B:
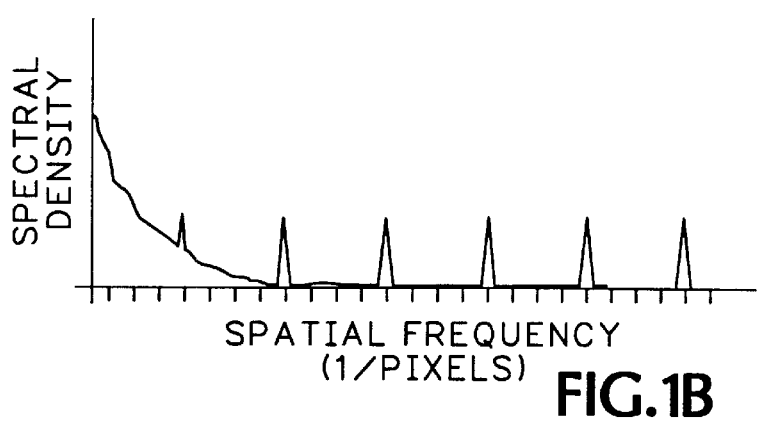
Figure 1C:
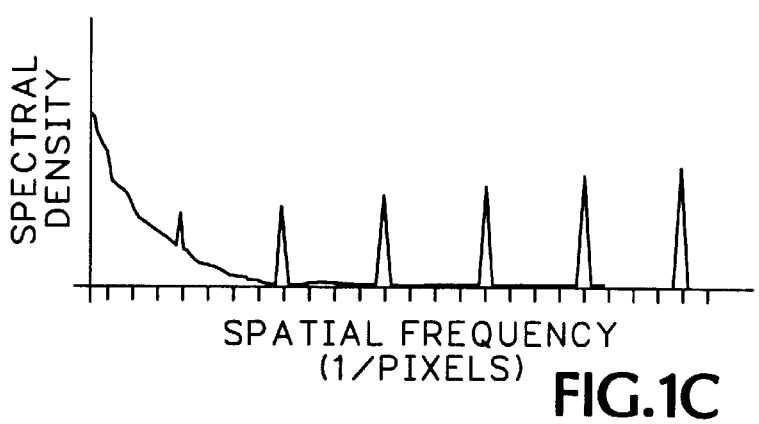
Figure 1D:
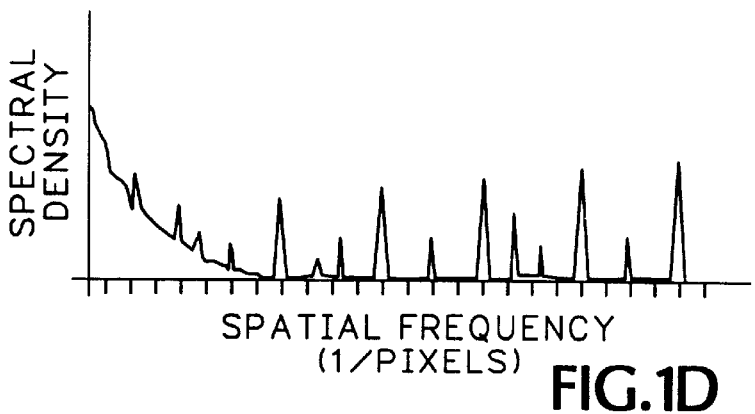

FIG. 1A represents a typical spectrum of a video field that is produced by video content in the absence of blockiness artifacts. This spectrum varies slightly from field to field, depending upon content, but the basic nature of its shape is preserved. FIG. 1B shows the typical spectrum where blockiness artifacts are present in the video. Here the peaks are located on integer multiples of frequency which is the reciprocal of the period with which the block boundaries occur. Ideally the peaks are all equal in magnitude, but the effects of implicit filtering may result in shapes such as illustrated in FIG. 1C. Video content often is rich in images with sharp edges or which carry artifacts incurred from finite impulse response (FIR) digital filtering. In these situations the situation illustrated in FIG. 1D may result, where various peaks in the spectrum are present along with peaks that represent the blockiness artifacts.

Figure 2:
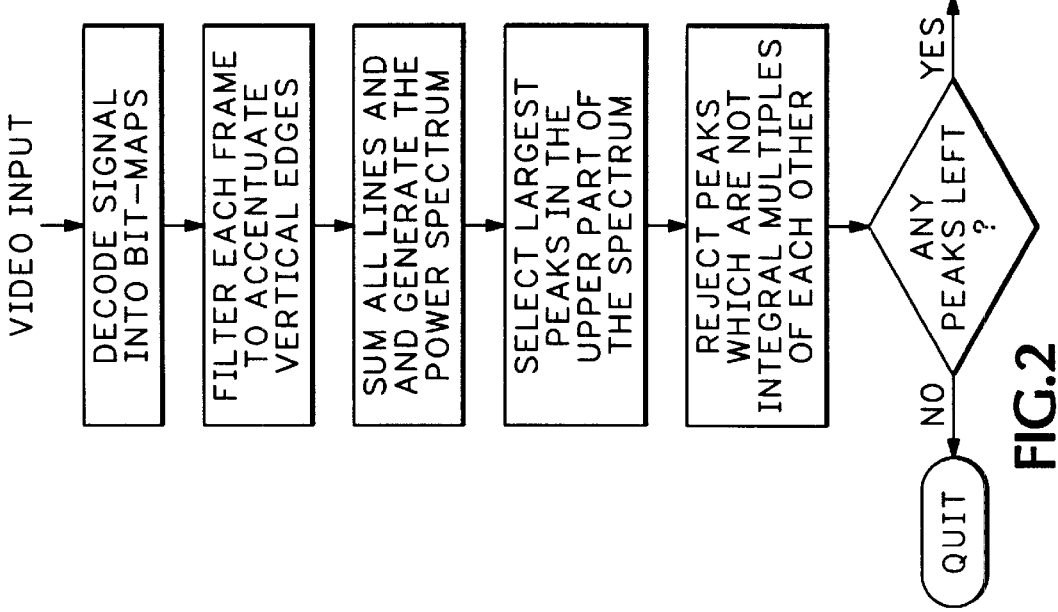
FIG. 2 is a flow-chart view of a system for measuring blockiness in video signals according to the present invention.

What is shown in FIG. 2 is a method of allowing removal of spurious frequency peaks in the spectrum from the measurement and thus allows identification and measurement of spectral content generated by blockiness artifacts. The large peaks from the higher frequency end of the spectrum are sorted from among the spectral peaks generated, and those spectral peaks that do not fall onto integer multiples of a frequency interval are rejected. By doing this, most spurious peaks in the spectrum are rejected and only the peaks generated by the blockiness artifact remain. The amount of blockiness present in the video is then determined as some aggregate measure derived from these spectral peaks, one such measure being the average of the amplitudes of the peaks.

Once the spectrum of the aggregate line is obtained, it is analyzed to determine the predominant spectral peaks and whether these peaks are regularly spaced, indicating blockiness. The first N discrete Fourier transform (DFT) coefficients, where N may equal 50 for a 512-point DFT, that correspond to the lowest frequency bins where most of the natural picture energy is located are discarded. Then the spectrum is filtered to obtain a smoothed baseline spectrum which is subtracted from the original to obtain a normalized spectrum. This removes most noise, such as white noise, and picture content energy from the spectrum. Then the largest P peaks in the spectrum are found, and this set is searched for a common period. The common period corresponds to the predominant blockiness period in the image.

Once the predominant blockiness period is determined, the amount of blockiness in that period is calculated. To do this the average harmonic peak height, after removing the estimated contributions to the peaks from half and double blockiness period, is measured. Then the blockiness amount is scaled by the blockiness period to obtain a normalized blockiness metric that may be compared across different periods.

Generally blockiness has horizontal and vertical components that are independent. As a tradeoff only the horizontal component is computed above. To calculate the vertical component, the horizontal blockiness detection above is run on the transpose of the original input image. Ideally a blockiness implementation computes the spectrum of each line and aggregates by averaging, rather than aggregating first and computing the spectrum. This prevents the phase characteristics of different lines from distorting the aggregate spectrum, i.e., canceling each other out before the magnitude is calculated. But this technique currently is prohibitively expensive, so a less robust implementation of measuring the blockiness in just one (horizontal) direction is used.

1. The amplitudes of the spectral coefficients between two frames with equal amounts of blockiness are proportional to the blockiness period, and the frame with the longer period has proportionally more peaks in its spectrum. So if frame 1 has a blockiness period of 8 and frame 2 has a blockiness period of 16, frame 1 has half as many spectral peaks at twice the amplitude than the spectral peaks from frame 2. The metric used to quantify blockiness takes this fact into account by normalizing the blockiness result by the blockiness period.

2. If a frame contains multiple blockiness periods that share common harmonics, i.e., 8 and 16, 8 and 12, etc., the aggregate spectrum is distorted. For the 8 and 16 case, for example, all of the spectral peaks for the blockiness period of 8 are increased by the contribution from the blockiness period 16 energy. Without accounting for this possibility, greater blockiness period 8 energy may be computed than is actually present. Conversely, to measure the blockiness period 16 spectral peaks, even spectral peaks which coincide with period 8 peaks are greater than odd peaks. This suggests the following way to estimate the relative contributions of period 8 and period 16 blockiness energies:

Given the desired blockiness period P to estimate the spectral energy, the average energy of the odd harmonics of period 2*P is computed and is subtracted from all the peaks of period P. The current implementation performs this first order correction for the potentially common (P, 2P) second harmonic case, but not for the more general (N*P, M*P) case which tries to account for arbitrary shared harmonic configurations.

3. If the goal is to calculate the blockiness metric at a known period, there potentially is an improvement in efficiency by just calculating the DFT coefficients at the desired frequencies directly rather than calculating the entire spectrum. For example for a blockiness of 8, only the coefficients at 64, 128 and 192 need be calculated for a 512-point DFT implementation. The spectral coefficients greater than 256 mirror those less than 256.

4. Because the DFT calculates only integral frequency bins, some error is introduced when harmonics fall on fractional frequency boundaries. Either a greater resolution may be calculated, i.e., using a 1024-point DFT with zero padding, or some form of interpolation. But with interpolation spectral smearing occurs, causing several of the neighboring bins in the DFT to receive energy from the fractional harmonic. The smaller the number of points in the DFT, the more the accuracy and precision of the blockiness metric degrades.

While the method described above derives an aggregate measure of blockiness of the whole image, the method may be applied to local regions of a video image and the aggregate measure of blockiness may be obtained by composing it from local measures of blockiness weighted according to a human vision filtering of the underlying image.

Figure 3:
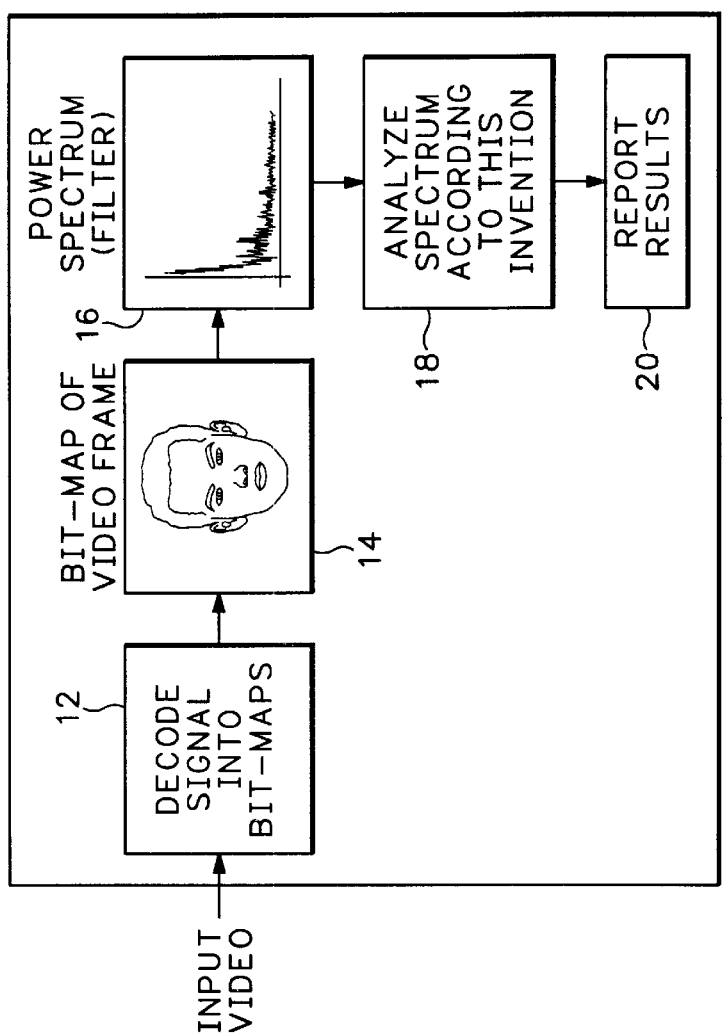
FIG. 3 is a block diagram view of an apparatus for measuring blockiness in video signals according to the present invention.

Referring now to FIG. 3 the apparatus required to implement the method includes a video signal receiver 12 which converts the video signal to digital form so it may be stored in an array or bit-map in computer memory 14, and a filter 16 to obtain the spectra as described above. Spectral peak information pertaining to blockiness impairment then is isolated, as described above, by an appropriate analyzer 18 and the blockiness measure is reported on an appropriate display 20.

Thus the present invention provides a measure of blockiness using frequency harmonics by generating from an input video signal a power spectrum, selecting the largest peaks in the spectrum, rejecting those that are not integer multiples of a frequency, finding the largest blockiness amount corresponding to each set of peaks, and reporting the blockiness period and amount for the dominant set of peaks.

What is claimed is:

1. A method of measuring blockiness in an input video signal using harmonics comprising the steps of:

generating a power spectrum for a video field of the input video signal;

selecting a set of peaks from the power spectrum that fall at a common frequency interval; and determining a blockiness measure for the set of peaks.

2. The method as recited in claim 1 wherein the generating step comprises the steps of:

filtering the video field to accentuate edges;

summing the lines of the filtered video field into a single line; and performing a Fourier transform on the single line to produce the power spectrum.

3. The method as recited in claim 1 wherein the selecting step comprises the steps of:

sorting large peaks at a higher frequency end of the power spectrum to obtain an initial set of peaks; and searching the initial set of peaks to find the set of peaks having a common period between the peaks, the common period defining the common frequency interval.

4. The method as recited in claim 3 wherein the sorting step comprises the steps of:

discarding the first N discrete Fourier transform coefficients representing the content of the video field corresponding to the lowest frequency bins;

filtering the power spectrum to obtain a smoothed baseline spectrum;

subtracting the smoothed baseline spectrum from the power spectrum to obtain a normalized spectrum; and finding the largest P peaks in the normalized spectrum as the initial set of peaks.

5. The method as recited in claim 1 wherein the determining step comprises the step of averaging the amplitudes of the set of peaks as the blockiness measure.

6. The method as recited in claim 3 wherein the determining step comprises the steps of:

removing contributions to the amplitudes of the set of peaks added by peaks at one-half and double the common period;

measuring an average harmonic peak amplitude of the peaks at the common period to obtain a blockiness amount; and scaling the blockiness amount by the common period to obtain a normalized blockiness metric as the blockiness measure.

7. The method as recited in claim 6 wherein the removing step comprises the steps of:

averaging the amplitudes of peaks at the odd harmonics of twice the common period to produce an average amplitude contribution; and subtracting the average amplitude contribution from the amplitudes of the peaks at the common period.

* * * * *